Jan. 26, 1965  J. B. NEWMAN  3,166,834
CATALYST BED REMOVING TOOL
Filed Feb. 8, 1963
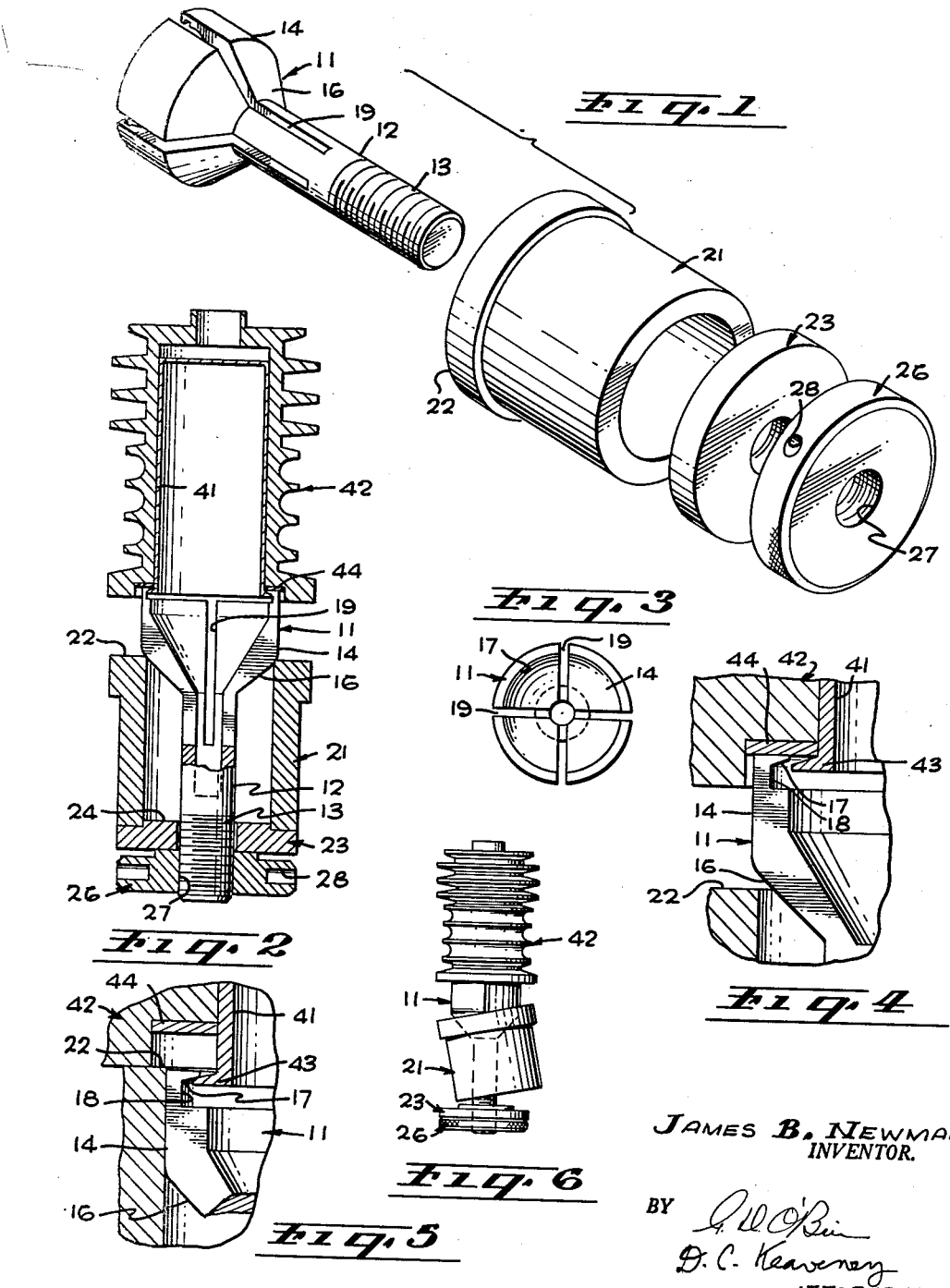
JAMES B. NEWMAN
INVENTOR.
BY
ATTORNEYS

United States Patent Office 3,166,834
Patented Jan. 26, 1965

3,166,834
CATALYST BED REMOVING TOOL
James B. Newman, Lancaster, Calif., assignor to the United States of America as represented by the Administrator of the National Aeronautics and Space Administration
Filed Feb. 8, 1963, Ser. No. 257,346
1 Claim. (Cl. 29—234)
(Granted under Title 35, U.S. Code (1952), sec. 266)

The invention described herein may be manufactured and used by and for the United States of America for governmental purposes without the payment of any royalties thereon or therefor.

The present invention relates to a removing tool adapted to firmly grip a flanged element to be removed and to subsequently apply an axial removal force while maintaining the aforesaid gripping action. In particular, the present invention is adapted to the removal without damage of catalyst bed elements, as may be employed for example, in power units generating steam by the chemical decomposition of hydrogen peroxide.

Although the present invention may be employed for the removal of flanged elements from containers in general, the following description of the invention is referenced to the removal of a cylindrical liner having a flanged outer end and normally slip-fitting into a shell, or the like. Elements such as these are employed in a chemical steam generating system wherein hydrogen peroxide is introduced under pressure to a catalyst bed made up of silver screens. There is produced in this system oxygen-rich steam at a very substantial temperature. The silver screens or liners require removal and replacement as a result of corrosion and deterioration thereof; however, the combination of high temperatures and corrosion causes the liner or catalyst bed to seize securely in the chamber formed by the catalyst bed shell. Consequently, the removal of this catalyst bed requires a very strong longitudinal or axial force to be applied thereto, together with a very firm gripping action upon the liner itself. Removal must be accomplished without damage to the sealing surface necessarily provided about the open end of the catalyst bed shell, and this precludes many types of removal operations.

The present invention provides a single, simple tool which by the actuation of a single element thereof, first securely grips the unit to be removed, and then exerts an axial force upon this unit while maintaining the gripping action. A minimum of components are employed in the tool of the present invention, and utmost simplicity is thereby attained. Provision is also made for insuring the application of a truly axial force upon the element to be removed, so that there is no possibility of jamming of the tool or of damaging the element being removed or the element from which it is removed.

In brief, the present invention comprises a collet having an elongated threaded shank together with a cylindrical member disposed about the shank. An alignment spacer fits the outer end of the cylinder, and a knurled knob is threaded onto the end of the shank, so that upon turning of this knob the cylinder is forced axially of the collet toward the open end theerof. A tapered surface upon the gripping portion of the collet provides for the cylinder to override this portion and thereby compress the collet to firmly grip a flange, or the like, about which the collet may be disposed. Continued turning of this knob then slides the cylinder over the collet so as to present a flat leading surface of the cylinder against the element from which the flanged unit is to be removed. Additional turning of the knob then applies a longitudinal force to the flanged element while firmly gripping the element by the collet, so as to withdraw the element without damage thereto.

A preferred embodiment of the invention is illustrated in the accompanying drawings, wherein:

FIGURE 1 is an exploded view of the elements of the present invention in perspective;

FIGURE 2 is a sectional view of the tool of the present invention in engagement with a catalyst bed for removal thereof;

FIGURE 3 is a front end view of the collet of the present invention;

FIGURE 4 is an enlarged, partial, sectional view of the collet of the present invention in position to engage the flange of a catalyst bed;

FIGURE 5 is an enlarged, partial, sectional view the same as FIGURE 4, but with the collet fully engaging the catalyst bed and the bed partially removed; and FIGURE 6 is a plan view of the tool of the present invention in contact with a catalyst bed before engagement of the tool therewith, and illustrating the self-centering feature of the present invention Considering now the present invention in some detail, and referring first to FIGURE 1 wherein there is shown the individual elements of this invention, it will be seen that there is provided a collet 11 having an elongated shank 12 with threads 13 thereon. The leading portion of this collet 11 is formed as a segmented collar or head 14 of greater diameter than the shank 12 and connected thereto by a frustum section having a tapered surface 16. The interior of the enlarged head or collar of the collet is hollow, as best seen in FIGURES 2 and 4, and an inwardly extending lip 17 is formed about the leading edge of the collet. As illustrated, the gripping portion at the leading edge of the collet may actually be formed by the provision of a groove 18 about the inner surface of the head 14 with a slanted upper surface defining the lip 17. In addition, the collet is longitudinally slotted, as indicated at 19, to thereby segment the collet head 14. This is best illustrated in FIGURE 3, wherein there are shown four such slots 19 and these slots preferably extend into the shank 12 of the collet, which is also hollow for a portion of the length thereof from the leading edge of the collet. By this structure, the head of the collet will thus be seen to be formed of a plurality of gripping fingers, or the like, disposed in circumferential arrangement so as to be laterally or radially movable into and out of engagement with some member to be contacted by the collet. In practice, this collet is preferably formed of steel and may thus be resiliently compressed to move the lip 17 radially inward for gripping an element to be engaged by the collet.

In addition to the foregoing element of the present invention, there is further provided a hollow cylinder 21 having an inner diameter which is slightly less than the normal outer diameter of the collet head. This cylinder 21 is formed with a flat leading surface 22 oriented toward the front of the collet and preferably the outer diameter of the cylinder is enlarged at this leading surface to thereby provide a substantial surface area 22, for reasons set forth below. The cylinder 21 is adapted to be fit over the collet about the shank thereof, as illustrated in FIGURE 2, and an additional element of the present invention in the form of an alignment spacer 23 closes the lower end of the cylinder. This alignment spacer 23 is centrally apertured to slip-fit over the collet shank 12, and is formed with a central boss 24 thereon of a diameter to fit into the lower end of the cylinder 21, again as illustrated in FIGURE 2.

A final element of the present invention consists of a knurled knob or nut 26 having a central threaded aperture 27 adapted to threadably engage the collet shank 12. This knurled knob or nut 26 may also have a central boss about the threaded aperture therethrough, for engaging the back or lower side of the alignment spacer in order to reduce the area of contact between these elements. Radial holes 28 are formed in this knurled knob 26 for the purpose of engagement of this element by a wrench or other leverage means for forcing rotation of the knob under those conditions wherein hand-turning thereof is not possible.

It will be seen that, in assembly, the removal tool of the present invention is comprised of the collet 11 with the cylinder 21 disposed about the shank thereof and the knob 26 threaded upon the shank and bearing against the alignment spacer engaging the lower end of the cylinder. Threading of the knob 26 upon the collet shank serves to force the cylinder toward the collet head so that the cylinder rides upon the tapered surface 16 of this head and consequently applies a radially inward force to the segmented head. This force then compresses the segments of the collet head to thereby move the lip 17 circumferentially inward. As the cylinder passes from the tapered portion of the head to the cylindrical portion, further turning of the knob 26 then moves the cylinder axially of the collet while maintaining the collet head segments compressed.

Application of the removal tool of the present invention to the removal of a catalyst bed from a catalyst bed shell is illustrated in FIGURES 2, 4, and 5. In FIGURE 2, there is shown a generally cylindrical catalyst bed or liner 41 disposed within a catalyst bed shell 42. As best seen in FIGURE 4, the catalyst bed 41 is formed with an outwardly extending flange 43 about the outer end thereof, and this flange is normally disposed within a recess in the outer end of the catalyst bed shell. Within this recess there is disposed a gasket 44, and in the removal of the catalyst bed it is of importance that the bearing surface of the gasket upon the catalyst bed shell not be damaged, for otherwise the shell itself must be discarded and replaced.

The initial positioning of the removal tool in relation to the catalyst bed is illustrated in FIGURE 4, wherein it will be seen that the collet is originally pressed against the gasket 44 about the outer flanged end of the catalyst bed. In this position, the knurled knob 26 is then threaded upon the collet shank to move the cylinder 21 upwardly, as shown in FIGURE 2. Turning the knob 26 forces the cylinder 21 upwardly to engage the tapered surface 16 of the frustum section, and consequently compresses the collet head segments to thereby move the lip 17 inwardly behind the catalyst bed flange 43. Continued turning of the knob 26 forces the cylinder even further upwardly past the tapered surface of the collet head and over the generally cylindrical surface, while yet maintaining the collet head compressed. The cylinder 21 then reaches the point wherein the leading surface 22 thereof engages the end of the catalyst bed shell, so that upon turning of the knob 26 there is exerted an axial force upon the collet itself to draw same within the cylinder 21.

The further turning of the knob 26 and withdrawing of the collet into the cylinder results in the situation illustrated in FIGURE 5, wherein the collet is shown to be moved downwardly into the cylinder, withdrawing the catalyst bed with the collet. The engagement of collet lip 17 and catalyst bed flange 43 is maintained by the continued compression of the collet by the cylinder 21, and movement of the knob 26 axially of the collet shank under the condition wherein the cylinder cannot move in space, results in movement of the entire collet into the cylinder.

Under conditions wherein the catalyst bed is very tightly seized within the catalyst bed shell, it may be necessary to apply extra leverage to the knob 26, and this may be accomplished by the utilization of a suitable wrench or spokes inserted in the radial openings 28 in this knob. Once the catalyst bed is broken loose from the catalyst bed shell, it is normally relatively simple to then pull the bed from the shell. There may, however, be provided any desired degree of forced collet movement relative to the cylinder merely by provision of a sufficient number of threads upon the collet shank. Once the catalyst bed is removed from the shell, it may be readily separated from the removal tool merely by threading the knob 26 downwardly on the collet shank and urging the cylinder 21 downwardly to thereby release the collet head segments. As the collet head segments are released to move laterally outward, the engagement of collet head lip 17 and catalyst bed flange 43 terminates, so that the catalyst bed may then be slipped from the collet head.

With regard to the alignment spacer provided in the removal tool of the present invention, it is noted that same provides for the axial movement of cylinder and collet. By the engagement of the alignment spacer boss 24 with the inner surface of the cylinder 21 and the sliding engagement of this alignment spacer with the collet shank, it will be seen that the cylinder can only move axially of the collet. Consequently, threaded rotation of the knob 26 cannot result in jamming of the elements of the tool. Furthermore, the tapered configuration of the lower portion of the collet head provides for original alignment of the cylinder and collet, as illustrated in FIGURE 6, so that the alignment spacer and collet head do then properly engage with the alignment spacer boss fitting into the lower end of the cylinder.

In addition to the relatively conventional collet action provided by the present invention for gripping an element by radial compression of fingers, or the like, there is furthermore provided herein that elements of the tool shall continue to move beyond this compression position to thereby exert a longitudinal or axial force upon the element gripped by the compressed collet. This additional longitudinal motion then provides for the exertion of the necessary longitudinal force for withdrawing of a flanged element from a container. The mere gripping of an element alone does not suffice for its removal without damage thereto. The present invention provides for the application of uniform forces over a maximum gripping area, and the application of this force in a longitudinal or axial direction, so that maximum utilization of the force is realized with a minimum possibility of damage to the element engaged to be removed by the tool of this invention.

Although the present invention has been described with respect to but a single preferred embodiment thereof, and in connection with a single preferred application of the invention, it is to be understood that no limitations are intended by the terms of this description, but instead, reference is made to the appended claim for a precise delineation of the true scope of this invention.

What is claimed is:

A removing tool comprising:
(a) a collet having an elongated threaded shank extending axially from a tapered segmented head having an inwardly facing lip about an open end thereof for fitting over a flanged element to be removed;
(b) a cylinder disposed about said collet shank with a flat leading surface facing said head and an inner diameter slightly less than the normal exterior diameter of said head;
(c) a nut threaded upon said shank and bearing upon said cylinder for moving the cylinder onto said head to compress the segments thereof and grip a flanged element, further threading of the nut onto the shank slipping the cylinder over the compressed head to engage a unit from which the flanged element is to be removed, whereby additional rotation of the nut exerts an axial force on the collet to draw it into the cylinder and remove a flanged element while gripping such element; and (d) an annular alignment spacer disposed about said shank between said cylinder and threaded nut, said spacer having a boss thereon of a diameter substantially equal to the inner diameter of said cylinder and a central opening therethrough substantially equal to the diameter of said shank, whereby said spacer seats in said cylinder to coaxially align the cylinder and shank upon tightening of the nut.

References Cited by the Examiner
UNITED STATES PATENTS

| | | | |
|---|---|---|---|
| 1,535,012 | 4/25 | Zeller | 29—263 X |
| 2,050,005 | 8/36 | Heegeman | 29—263 |

WILLIAM FELDMAN, *Primary Examiner.*